United States Patent
Matsunaga et al.

(10) Patent No.: US 6,704,932 B1
(45) Date of Patent: *Mar. 9, 2004

(54) MULTI-ACCESS COMMUNICATION SYSTEM AND UPLINK BAND ALLOCATING METHOD

(75) Inventors: Yasuhiko Matsunaga, Tokyo (JP); Morihisa Momona, Tokyo (JP)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,838

(22) Filed: Jan. 13, 1999

(30) Foreign Application Priority Data

Jan. 16, 1998 (JP) ............................................ 10-018318

(51) Int. Cl.[7] ........................ H04N 7/173; H04B 7/212; H04L 12/403; H04L 12/42; H04J 3/16; H04J 3/22

(52) U.S. Cl. ........................ 725/126; 725/95; 725/96; 725/121; 370/322; 370/348; 370/444; 370/449; 370/455; 370/468

(58) Field of Search ........................ 725/95, 96, 121, 725/126; 370/322, 348, 444, 449, 455, 468

(56) References Cited

U.S. PATENT DOCUMENTS

| | | | | |
|---|---|---|---|---|
| 5,353,285 A | * | 10/1994 | Van Der Plas et al. | 370/443 |
| 5,557,612 A | * | 9/1996 | Bingham | 370/449 |
| 5,615,212 A | * | 3/1997 | Ruszczyk et al. | 340/825.52 |
| 5,917,822 A | * | 6/1999 | Lyles et al. | 370/395.4 |
| 6,307,839 B1 | * | 10/2001 | Gerszberg et al. | 370/230 |
| 6,324,184 B1 | * | 11/2001 | Hou et al. | 370/468 |
| 6,327,254 B1 | * | 12/2001 | Chuah | 370/322 |

* cited by examiner

*Primary Examiner*—John Miller
*Assistant Examiner*—Michael W. Hoye
(74) *Attorney, Agent, or Firm*—Dickstein, Shapiro, Morin & Oshinsky, LLP.

(57) ABSTRACT

In a multi-access communication system where a center station dynamically allocates the band of an uplink to subscriber stations, the band of an uplink is flexibly and efficiently allocated when the up-service quality is insured. When requesting a service quality assurance, the subscriber station 30 transmits the service quality request information 210 to the center station 10. The center station 10 transmits the identifier allocation information 310 to the subscriber station 30 to allocate an identifier. When the service priority is high, the center station 10 periodically transmits the reservation transmission permission information 410 and 411 to the subscriber station 3 at the reservation permission transmission intervals 910, thus checking for the presence or absence of reservation information. Waste consumption of the up-band can be suppressed by periodically transmitting the reservation transmission permission information even if subscriber stations issue up-data at irregular intervals. The upper limit value of up-delay amount can be insured by adjusting the transmission period of reservation transmission permission information.

22 Claims, 14 Drawing Sheets

MULTI-ACCESS COMMUNICATION SYSTEM AND UPLINK BAND ALLOCATING METHOD

BACKGROUND OF THE INVENTION

The present invention relates to a multi-access communication system such as a bi-directional CATV network or passive optical star network where a center station dynamically allocates the band of an up-link to subscriber stations, and more particularly to a method for insuring the service quality on an uplink.

In the communication system including bi-directional CATV networks and passive optical star-networks, the downlink linked from a center station to subscriber stations generally is of a broadcast type while the uplink linked from a subscriber station to the center station is of a multi-access type using the time division multiplexing. The center station allocates an identifier when a subscriber station starts its operation. Next, when the subscriber station transmits up data to the center station, the center station first transmits up-band reservation permission information to a subscriber station group. Next, a subscriber station holding up data to be transmitted transmits reservation information formed of an identifier and a reserved up band to the center station. When pieces of reservation information simultaneously transmitted from plural subscriber stations collide with each other on the up line, the center station and the related subscriber stations solve the collision problem. Finally, the center station properly receives all pieces of reservation information. When holding data to be next transmitted at a data transmission time, the subscriber station adds the next reservation information to the up data and then transmits it to the center station. The center station creates up-band allocation information based on the reservation information and then informs the subscriber station of it. The subscriber station transmits the up data to the center station at an allocated up band. When the subscriber station does not require the service quality, the center station evenly allocates the up band to all subscriber stations every up transmission packet.

On the other hand, when the service quality which requires a band to be secured and the upper limit of a transmission delay amount as in the telephone and moving images communications is known, it is necessary to insure the service quality provided on the up-line every subscriber station. Conventionally, in order to insure the service quality on the up-multi-access line, the subscriber station informs the center station of a required service quality before transmitting up reservation information, whereas the center station periodically allocates the band for an up line in response to the service quality. When a plurality of up services are provided, the up-band allocation priority control is performed by specifying the service priority based on reservation permission information, reservation information or band allocation information and time-dividing the band of an uplink with the priority. As previous reports, there are "IEEE Communication Magazine", written by James E. Dail et. al, pp. 104–112, March 1996 and "IEEE Transactions on Communications", written by P. Papantori-Kazakos, Vol. 40, No. 3, pp. 541–555, March 1992.

Likewise the conventional multi-access communication system, the priority controlling method, which designates priority based on reservation permission information or band allocation information and then allocates an up band, requires to previously and fixedly determine various up-service-to-priority relationships between the center station and subscriber stations. Hence, the conventional system has disadvantage of being difficult to finely control the priority according to the up-service quality, thus lacking the flexibility.

Moreover, like the conventional multi-access communication system, there is the disadvantage in that when the center station insures the service quality by periodically allocating up-bands, the allocated up-band becomes wasteful. The reason is that when subscriber stations generate up data at irregular intervals, it often occurs that although the center station allocates the up-band of an uplink to a subscriber station, the subscriber station does not have up-data to be transmitted. Particularly, when the up-band data length is variable, it is difficult that the subscriber station accurately estimates an average up-data length to be reported. The problem is that when an average up-data length longer than the actual data length is reported, the up-band is excessively allocated and that when an average up-data length shorter than the actual data length is reported, the up-band allocation is delayed.

SUMMARY OF THE INVENTION

The objective of the present invention is to solve the above-mentioned tasks.

Moreover, the objective of the invention is to provide a multi-access communication system such as bi-directional CATV networks, passive optical star networks, or the like, where a center station dynamically allocates uplink bands to subscriber stations, can flexibly and effectively allocate uplink bands for the up-service quality assurance.

Furthermore, the objective of the present invention is to provide a method of flexibly and effectively allocating uplink bands in a multi-access communication system to insure the up-service assurance.

The objective of the first aspect of the present invention is achieved by a multi-access communication system comprising a center station including means for allocating identifiers to subscriber stations; means for transmitting reservation transmission permission information to the subscriber stations, means for receiving reservation information from a subscriber station; means for allocating an up band based on the reservation information from the subscriber station; means for receiving service quality request information from the subscriber station; means for allocating an identifier to a subscriber station according to a requested service quality; and means for allocating bands from data with higher priority according to the service quality designated by the identifier of reservation information from a subscriber station.

Moreover, the subscriber station includes means for receiving an identifier allocated from a center station; means for receiving reservation transmission permission information from the center station; means for transmitting reservation information to the center station at an up band designated with the reservation transmission permission information; means for receiving up-band allocation information from the center station; means for transmitting up-data to the center station at an up-band designated with the up-band allocation information; means for transmitting service quality request information to the center station; and means for adding an identifier according to the service type of the up-data to be transmitted and adding an identifier according to the service type of the up-data to be transmitted to reservation information to be transmitted to the center station.

In the multi-access communication system of the second aspect of the invention, the center station has means for periodically transmitting reservation transmission permission information to which the identifier of the service is added, to the subscriber station using a high priority service.

In the multi-access communication system of the third aspect of the invention, the center station includes means for allocating a unique identifier to each of the subscriber stations each using a high priority service and allocating a common identifier to a group of a subscriber station group using the high priority service, and means for periodically transmitting reservation transmission permission information to which a common identifier is added, to the subscriber station group using a high priority service, and the subscriber station includes means for transmitting reservation information for an up-band to the center station in response to the reservation transmission permission information if there is up-data to be transmitted corresponding to service designated by the identifier.

In the multi-access communication system of the fourth aspect of the invention, when the center station receives a new service quality request information from a subscriber station, the center station has means for allocating a new unique identifier to the subscriber station and means for allocating a common identifier to the subscriber station group using the same identifier. Moreover, when the subscriber station starts to use a new service, the subscriber station has means for informing the center station of the quality of the service, means for receiving a new unique identifier allocated by the center station, and means for receiving a common identifier allocated to the subscriber station group using the same service type.

In the multi-access communication system of the fifth aspect of the invention, the center station has means for periodically transmitting up-band allocation information to the subscriber station according to a service quality informed from the subscriber station, for periodically transmitting reservation transmission permission information with a unique identifier to the subscriber station, for periodically transmitting reservation transmission permission information to the subscriber station group, the subscriber station group including the subscriber station and using the same service, or for selectively performing a periodic transmission control to a service.

In the multi-access communication system of the sixth aspect of the invention, the center station has means for periodically measures an up-load received from said subscriber station; and means for periodically transmitting up-load allocation information to the subscriber station according to a measured up-load value, for periodically transmitting reservation transmission permission information to the subscriber station, the reservation transmission permission information having a unique identifier, for periodically transmitting reservation transmission permission information to the subscriber station group, the subscriber station group including the subscriber station and using the same service, or for selectively performing a periodic transmission control to the service.

Moreover, according to the present invention, a method of allocating uplink bands in a multi-access communication system, the multi-access communication system including a center station, subscriber stations, a broadcast downlink linked from the center station to the subscriber stations, and a multi-access uplink linked from the subscribers to the center station, wherein the center station previously allocates identifiers to the subscriber station, wherein a subscriber station having up-data to be transmitted transmits reservation information within a band permitted by the center station, the reservation information being formed of an identifier and an up-band to be reserved, wherein the center station allocates a band of the uplink to the subscriber station based on the reservation information, the method comprising the steps of previously issuing service quality assurances from the subscriber stations to the center station when the subscriber stations request the service quality assurance; allocating an identifier for each of the service assurances by means of the center station and then informing the subscriber stations of the allocation; transmitting, when the center station transmits the reservation transmission permission information to the subscriber stations, the reservation information by means of the subscriber stations by adding an identifier according to the service type of the up-data to be transmitted; and allocating up-bands from data with higher priority in decreasing order of priority by means of the center station according to the service quality designated by the identifier of the reservation information.

More specifically, in the multi-access communication system according to the first aspect of the invention, when first requesting a service quality assurance, the subscriber station informs the center station of the quality required for each service. The service quality request information includes an average rate of a service, a peak rate, a packet length, the upper limit value of a delay amount, and others. The center station allocates an identifier to a subscriber station according to a requested service quality. At this time, the center station can grasp the relationship between the identifier and the priority allocated to a service. It is not particularly required that the subscriber station grasps the relationship between the identifier and the priority allocated. Next, in response to reservation transmission permission information from the center station, the subscriber station transmits to the center station reservation information with an identifier according to the service of up-data to be transmitted. If there is up-data to be transmitted, the subscriber station calculates an up-band volume to be reserved. If there is no up-data, the subscriber station sets the up-band volume to zero. On the other hand, the center station allocates an up-band from data with higher priority in decreasing order of priority according to the service quality designated by the identifier of reservation information. If the reserved up-band volume is zero, the center station does not allocate the up-band. As described above, the center station allocates an identifier to a subscriber station according to the service quality required by the subscriber station while the subscriber station transmits reservation information using the identifier. Hence, the band can be flexibly controlled according to the up-service quality, without previously and fixedly determining the reservation information to priority relationship between the center station and the subscriber station.

In the multi-access communication system according to the second aspect of the invention, when receiving service quality request information from a subscriber station using a high service priority, the center station decides the transmission period of reservation solicitation information to be transmitted to a requested subscriber station based on the service quality request information. Thereafter, the center station transmits reservation transmission permission information to which a service identifier is added every transmission period determined. The length of reservation information generally is sufficiently shorter than that of the up-data while the use amount of the up-band is small. Hence, compared with the conventional method of periodically transmitting up-band allocation information to a subscriber station based on the service quality request information, it can be suppressed that the up-band is wastefully used even when the interval between pieces of up-data created by the subscriber station is varied. Since the center station transmits reservation transmission permission information only to the subscriber station requesting a service quality with high priority, the upper limit value of an up delay amount can be insured because pieces of up-reservation information such common data from subscriber stations do not collide with each other.

In the multi-access communication system according to the third aspect of the invention, the center station allocates a unique identifier to each subscriber station using a service with high priority as well as a common identifier to a subscriber station group using the service. Thereafter, the center station periodically transmits reservation transmission permission information with the common identifier to the subscriber station group using a service with high priority. The transmission period of the reservation transmission permission information is decided based on the service information from the subscriber station group using the same service. The subscriber station transmits reservation information to the center station only when there is up-data to be transmitted corresponding to the service of an identifier added to the reservation transmission permission information. If there is no up-data, the subscriber station transmits the reservation information. As described above, the reservation transmission permission information is periodically transmitted to a subscriber station group using the same service, using the common identifier, so that only the subscriber station with up-data to be transmitted returns the reservation information. As a result, the use efficiency of an up-band can be increased.

According to the multi-access communication system of the first, second or third aspect of the invention, in the multi-access communication system according to the fourth aspect of the invention, when the subscriber station starts the use of a new service, allocates a unique identifier, it informs the center station of the quality of the new service. The center station allocates a new unique identifier to the subscriber station as well as a common identifier to a subscriber station group using the same service. As described above, since the center station dynamically allocates an identifier for service to the subscriber station, the subscriber can make a request for an up-service quality at an arbitrary time. The center station transmits reservation transmission permission information while the subscriber station stops using a service, so that the use efficiency of an up-band can be improved.

In the multi-access communication system according to the fifth aspect of the invention, the center station selects the method of allocating an up-band according to a service quality required by the subscriber station. For example, in the case where a subscriber station asks for a delay amount as small as possible and where the packet length as well as variations in data generation interval of a subscriber station are small, the center station periodically allocates the up-band to the subscriber station. Although it is necessary to insure the upper limit value of a delay amount and where the packet length as well as variations in data generation interval of a subscriber station are large, the center station periodically transmits to the subscriber station the reservation transmission permission information to which a unique identifier is added. In the case where it is unnecessary to insure the upper limit value of a delay amount and where the packet length as well as variations in data generation interval of the subscriber station are large and where a small delay amount is required, the center station periodically transmits reservation transmission permission information to which a common identifier is added, to a subscriber station group using the same service. Finally, in the case where there is no request to a delay amount and where the band must be preferentially allocated to the common data in a congestion state, the reservation information is preferentially processed according to the identifier, without particularly performing the periodic transmission control by designating a service. As described above, the center station can flexibly allocate the up-band by selecting the up-area allocating method according to a service quality requested by a subscriber station.

In the multi-access communication system according to the sixth aspect of the invention, the center station measures an up-load received from a subscriber station and selects the up-band allocating method to the subscriber station according to the up-load. For example, when it is necessary to allocate an up-band preferentially to common data in an up-congestion state and to decrease the delay amount, the center station periodically transmits either up-band allocation information to the subscriber station or reservation-transmission permission information with a unique identifier to the subscriber station. When the up-load is middle, the center station periodically transmit reservation transmission permission information with a common identifier to a subscriber station group using the same service. Finally, in the case where the up-load is small and where the delay time of common data is sufficiently small, only the reservation information is preferentially processed according to the identifier, without particularly performing the periodic transmission control by designating a service. As described above, since the center station selects the up-band allocating method according to load conditions, the up-band can be allocated with high efficiency.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, embodiment according to the present invention will be described in detail by referring to the attached drawings.

First Embodiment

Figure 1:
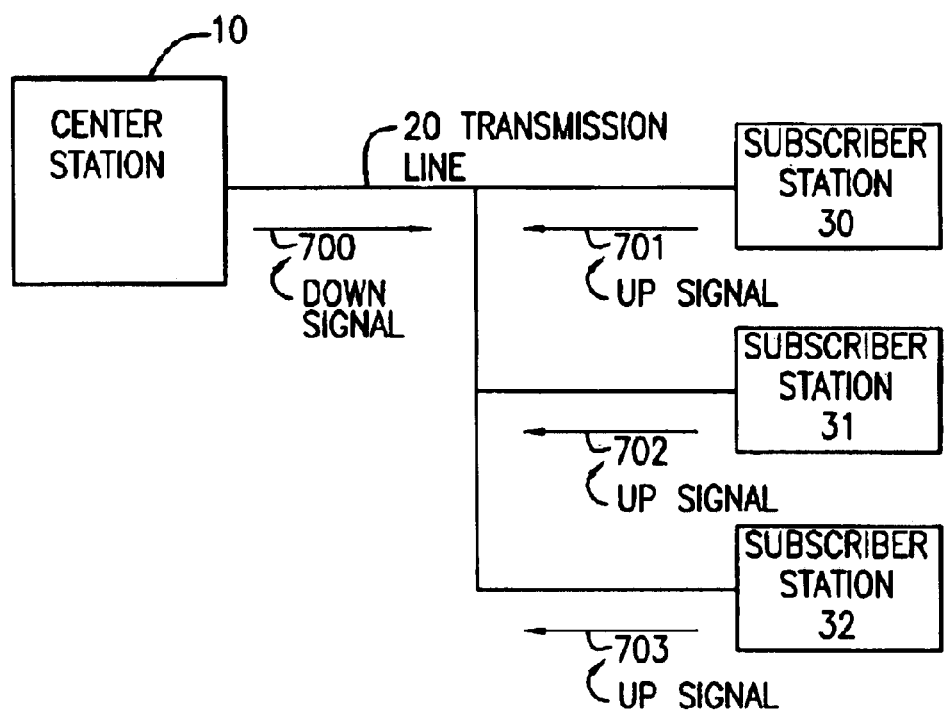
FIG. 1 is a connection diagram illustrating the center station 10, the transmission line 20, and the subscriber stations 30, 31 and 32 in a multi-access communication system according to a first embodiment of the present invention.

FIG. 1 is a connection diagram illustrating a center station 10, a transmission line 20, and subscriber stations 30, 31 and 32 in a multi-access communication system according to the first embodiment of the present invention. The center station 10 is connected to the subscriber stations 30, 31, and 32 via the transmission line 20. The down signal 700 is transmitted from the center station to the subscriber stations 30, 31 and 32 via a program circuit. The up signal 701 is transmitted from the subscriber station 30 to the center station via the multi-access line; the up signal 702 is transmitted from the subscriber station 31 to the center station via the multi-access line; and the up signal 703 is transmitted from the subscriber station 32 to the center station via the multi-access line.

Figure 2:
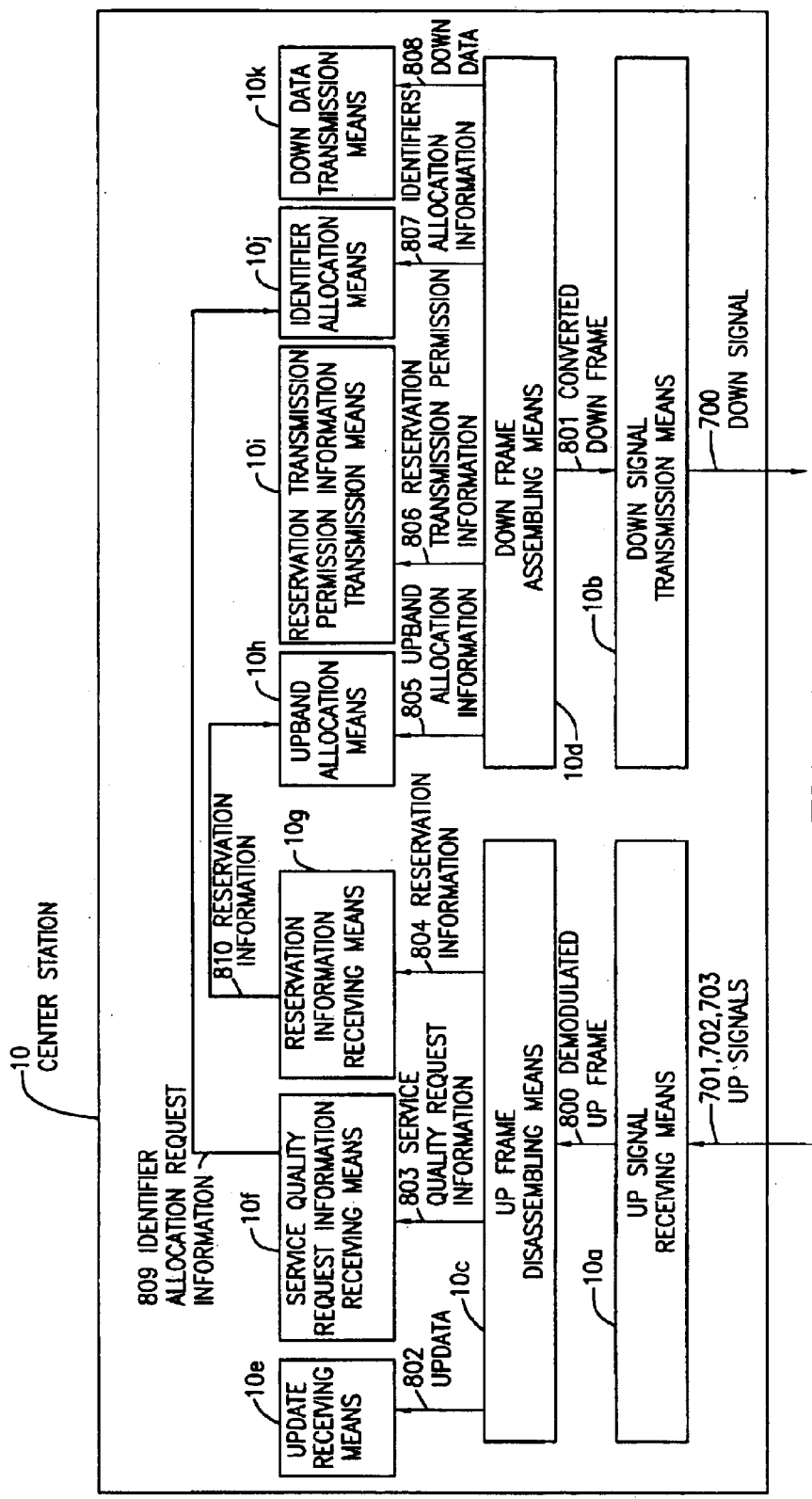
FIG. 2 is a block diagram illustrating the center station 10 in a multi-access communication system according to a first embodiment of the present invention.

FIG. 2 is a diagram illustrating the configuration of the center station 10 according to the first embodiment of the present invention. The center station 10 consists of up-signal receiving means 10a, down-signal transmission means 10b, up-frame disassembling means 10c, down-frame assembling means 10d, up-data receiving means 10e, service-quality-request information receiving means 10f, reservation information receiving means 10g, up-band allocation means 10h, reservation-transmission-permission-information transmission means 10i, identifier allocation means 10j and down-data transmission means 10k.

The up-signal receiving means 10a receives up signals 701, 702 and 703 input from an up multi-access line and then outputs demodulated up-frame 800 to the up-frame disassembling means 10c. The up-frame disassembling means 10c disassembles the up-frame 800 and then outputs up-data 802 to the up-data receiving means 10e, service-quality-request information 803 to the service-quality-request information receiving means 10f, and reservation information 804 to the reservation information receiving means 10g.

The up-data receiving means 10e performs a receiving process of the up data 802. The service-quality-request information receiving means 10f analyzes the service-quality-request information 803 and outputs identifier-allocation-request information 809 to the identifier allocation means 101. The reservation information receiving means 10g outputs the reservation information 810 to the up-band allocation means 10h by queuing the reservation information according to the priority of an identifier added to the reservation information and then processing the reservation information in the decreasing order of priority.

The up-band allocating means 10h outputs the up-band allocation information 8-5 to the down-frame assembling means 10d based on the reservation information 810 input from the reservation information receiving means 10g. The reservation-transmission-permission information transmission means 10i outputs reservation-transmission-permission information 806 to the down-frame assembling means 10d to collect reservation information. The identifier allocation means 10j allocates an identifier to a subscriber based on the identifier allocation-request information 809 input from the service-quality-request information receiving means 10f and then outputs the identifier allocation information 807 to the down-frame assembling means 10d. The down-data transmission means 10k performs a down-data transmission process and outputs the down data 808 to the down-frame assembling means 10d.

Figure 3:
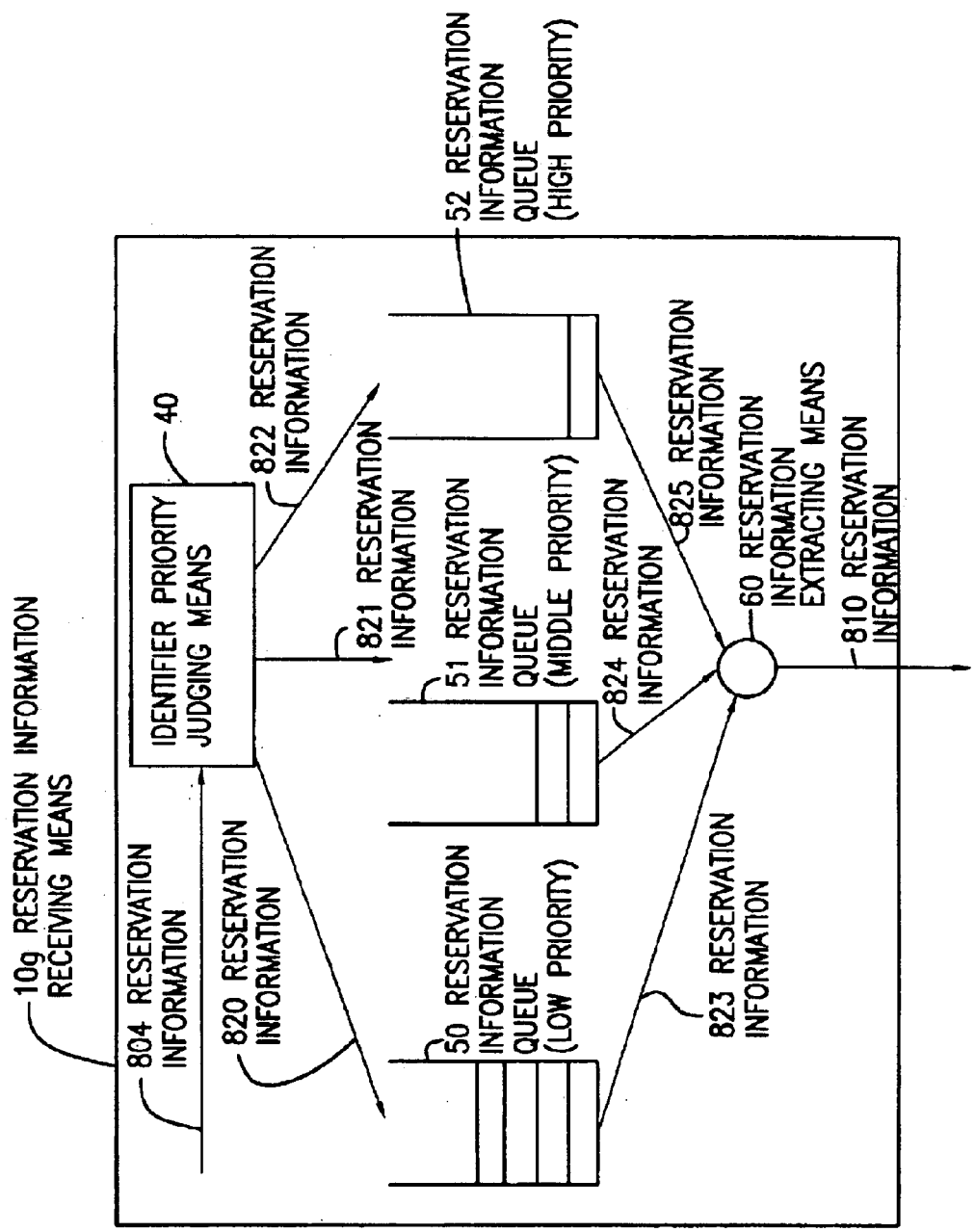
FIG. 3 is a block diagram illustrating the reservation information receiving means log in the center station 10 in a multi-access communication system according to a first embodiment of the present invention.

FIG. 3 is a diagram illustrating the configuration of the reservation information receiving means 10g in the center station 10 according to the first embodiment of the present invention. The reservation information receiving means 10g consists of identifier priority judging means 40, reservation information queues 50, 51 and 52 and 20, reservation information extracting means 60.

The identifier priority judging means 40 judges the priority corresponding to the identifier of a service added to the reservation information 804 and then outputs the reservation information 820 to the reservation information queue 50 according to the priority, the reservation information 821 to the reservation information queue 51 according to the priority, and the reservation information 822 to the reservation information queue 52 according to the priority. The reservation information queues 50, 51 and 52 are queues each for temporarily holding received reservation information. The reservation information is output in the inputting order to the queue. When the number of pieces of reservation information exceeds a predetermined threshold value, the reservation information is discarded. The reservation information queue 50 holds reservation information with a low priority. The reservation information queue 51 holds reservation information with a middle priority. The reservation information queue 52 holds reservation information with a high priority. The reservation information extracting means 60 takes the reservation information 823, 824 and 825 out of the queue with high priority in decreasing order of priority and then outputs the reservation information 810.

Figure 4:
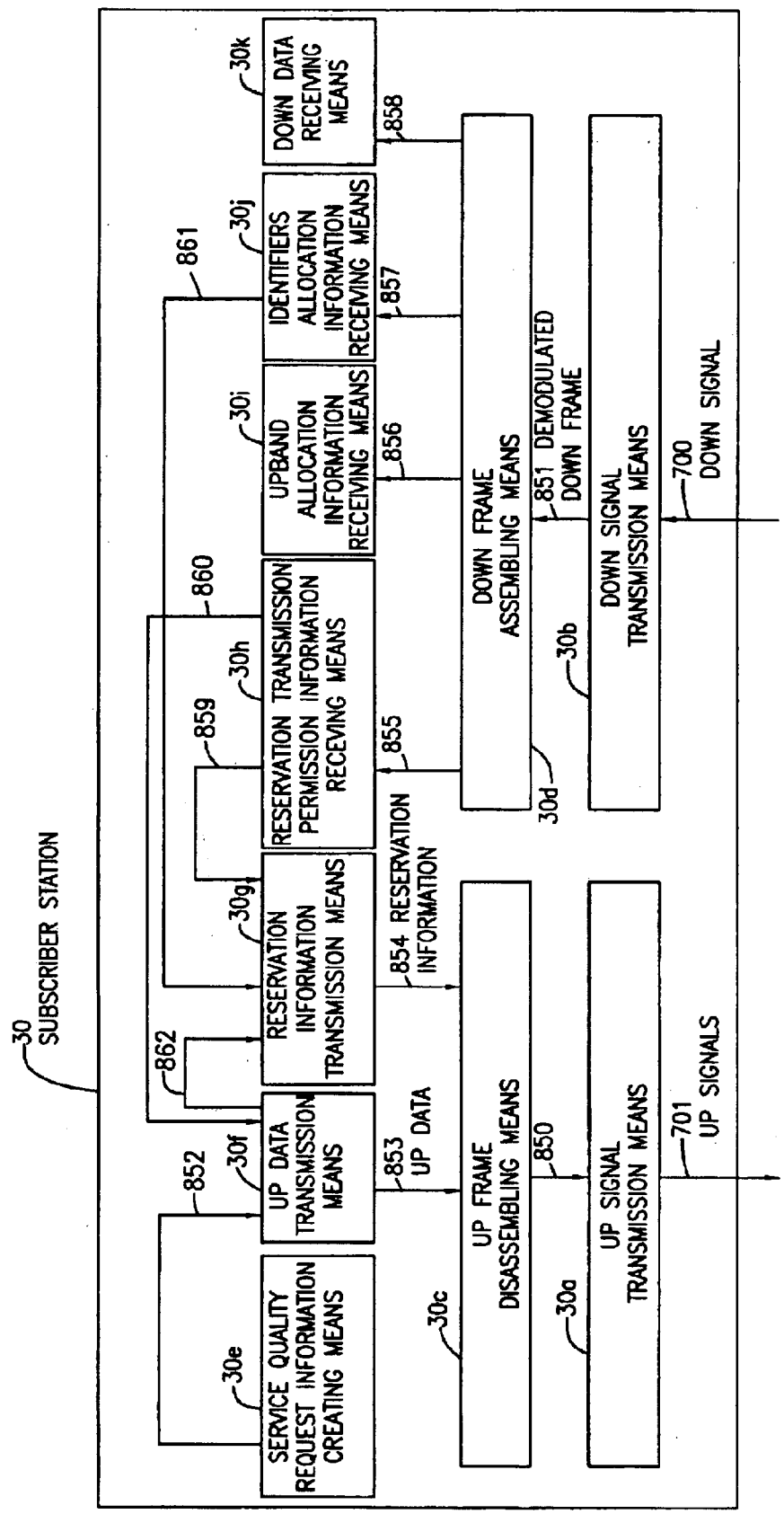
FIG. 4 is a block diagram illustrating the subscriber station 30 in a multi-access communication system according to a first embodiment of the present invention.

FIG. 4 is a diagram illustrating the configuration of the subscriber station 30 according to the first embodiment of the present invention. The subscriber station 30 consists of up-signal transmission means 30a, down signal receiving means 30b, up-frame assembling means 30c, down-frame disassembling means 30d, service-quality-request information creating means 30e, up-data transmission means 30f, reservation information transmission means 30g, reservation-transmission-permission information receiving means 30h, up-band allocation information receiving means 30i, identifier allocation information receiving means 30j, and down-data receiving means 30k.

The down signal receiving means 30b receives the down signal 700 input froma down program circuit and then outputs the demodulated down frame 851 to the down-frame disassembling means 30d. The down-frame disassembling means 30d extracts reservation transmission permission information 855 from the down frame and then outputs it to the reservation-transmission-permission information receiving means 30h. The down-frame disassembling means 30d extracts up-band allocation information 856 from the down frame 851 and then outputs it to the up-band allocation information receiving means 30i. The down-frame disassembling means 30d extracts identification allocation information 857 from the down-frame 851 and the outputs it to the up-band allocation information receiving means 30j. The down-frame disassembling means 30d extracts down data 858 from the down frame 851 and then outputs it to the down-data receiving means 30k.

When the reservation-transmission-permission information 855 is for either the subscriber station 30 or a subscriber station group including the subscriber station 30, the reservation-transmission-permission information receiving means 30h outputs the reservation-transmission-permission information 859 to the reservation information transmission means 30g. When the reservation transmission permission information 855 is for stations other than the subscriber station 30, the reservation-transmission-permission information receiving means 30h discards the reservation-transmission-permission information 855. When the up-band allocation information 856 is for the subscriber station 30, the up-band allocation information receiving means 30i outputs the up-data transmission request information 860 to the up-data transmission means 30f. When the up-band allocation information 856 is for stations other than the subscriber station 30, the up-band allocation information receiving means 30i discards the up-band allocation information 856. If the identification allocation information 857 is for the subscriber station 30, the identifier allocation information receiving means 30j outputs the identifier information 861 formed of service information corresponding to an allocated identifier to the reservation information transmission information 30g. If the identification allocation information 857 is for a station other than the subscriber station 30, the identifier allocation information receiving means 30j discards the identification allocation information 857. If the down data 858 is for the subscriber station 30, the down-data receiving means 30k performs the receiving process. If the down data 858 is for a station other than the subscriber station 30, the down-data receiving means 30k discards the down data 858.

When the subscriber 30 requests the quality assurance of a service to be used, the service-quality-request information creating means 30e creates the service quality request information 852 for every service requested, and then outputs it to the up-data transmission means 30f. The up-data transmission means 30f holds common data or the service quality request information 852 and then outputs the reservation request information 862, which is formed of a data volume to be next transmitted and the service type thereof, to the reservation information transmission means 30g. When receiving the up-data transmission request information 860, the up-data transmission means 30f outputs the up-data 853 to the up-frame assembling means 30c. When receiving the reservation transmission permission information 859 for the subscriber station 30 (or a subscriber group including the subscriber station 30), and for the reservation request information 862, the reservation information transmission means 30g outputs the reservation information 854 to the up-frame assembling means 30c by calculating the up-reservation volume and adding an identifier corresponding to the service type. When the reservation-transmission-permission information 859 is for the subscriber station 30 and while the reservation request information 862 is not input, the reservation information transmission means 30g sets the up reservation volume to zero and then outputs means 30c. Moreover, when the reservation-transmission-permission information 859 is for a subscriber station group including the subscriber station 30 and while the reservation request information 862 is not input, the reservation information transmission means 30g prohibits the reservation 854 to be outputted to the up-frame assembling means 30c.

The up-frame assembling means 30c converts both the up data 853 and reservation information 854 into an up frame 850 and then outputs it to the up-signal transmission means 30a. The up-signal transmission means 30a modulates the up frame 850 and outputs the up signal 701 to the up multi-access line.

Figure 5:
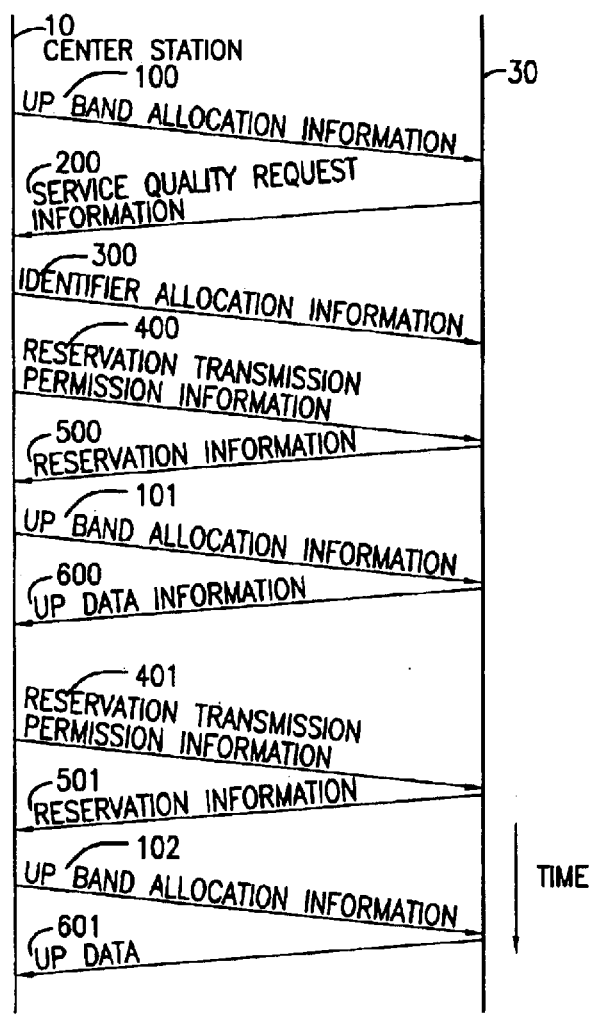
FIG. 5 is a flowchart illustrating the operation of the center station 10 and the operation of the subscriber station 30 in a multi-access communication system according to a first embodiment of the present invention.

FIG. 5 is a flowchart illustrating the operation of the center station 10 and the operation of the subscriber station 30 according to the first embodiment of the present invention. The case where the subscriber station 30 requires the quality assurance of an up service and transmits up data of the service will be described below.

In an up-service quality assurance requesting mode, when receiving the up-band allocation information 100 from the center station 10, the subscriber station 30 transmits the service quality request information 200 to the center station 10. The center station 10 allocates an identifier corresponding to the service quality requested according to the service quality request information 200 and transmits the identifier allocation information 300 to the subscriber station 30. In the mode of transmitting the up data for the service, when receiving the reservation transmission permission information 400 from the center station 10, the subscriber station 30 transmits reservation information 500 formed of an identifier and an up-band reservation volume allocated to the service, to the center station 10. The center station 10 judges a priority based on the identifier added to the reservation information 500, processes the reservation information 500 according to the priority, and then transmits the up-band allocation information 101 to the subscriber station 30. The subscriber station 30 transmits the up-data information 600 over the band allocated according to the up-band allocation information 101. In a similar manner, when the center station 10 transmits the reservation-transmission-permission information 401 to the subscriber station 30, the subscriber station 30 transmits the reservation information 501 with an identifier to the center station 10. On the other hand, when the center station 10 transmits the up-band allocation information 102 to allocate the up band, the subscriber station 30 transmits the up data 601 to the center station 10. As described above, since a subscriber station adds an identifier to reservation information according to a required service quality and then transmits the result, it is unnecessary that the up-service-to-priority relationships are previously and fixedly determined between the center station and a subscriber station, so that the band allocation control can be performed according to the up-service quality.

Figure 6:
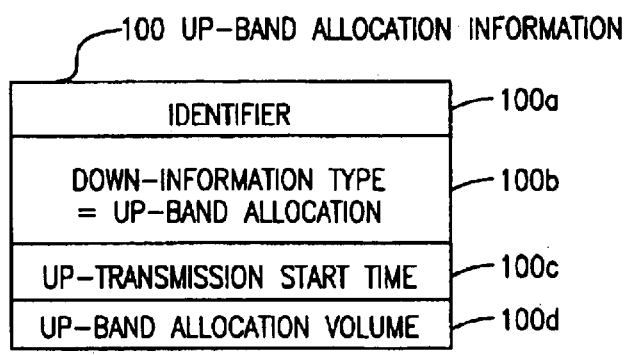
FIG. 6 is a diagram illustrating the format of the up-band allocation information 100 in a multi-access communication system according to a first embodiment of the present invention.

FIG. 6 is a diagram illustrating the format of the up-band allocation information 100 according to the first embodiment of the present invention. The up-band allocation information 100 is formed of an identifier 100a, a down-information type 100b, an up-transmission start time 100c and an up-band allocation volume 100d. The identifier 100a is an identifier previously allocated to the subscriber station 30 by the center station 10. The down-information type 100b represents the type of information regarding a down frame, that is, up-band allocation information. The up-transmission start time 100c represents a time of starting up data transmission. The up-band allocation volume 100d represents an up-band volume of the subscriber station 10 allocated from the up-transmission start time 100c.

Figure 7:
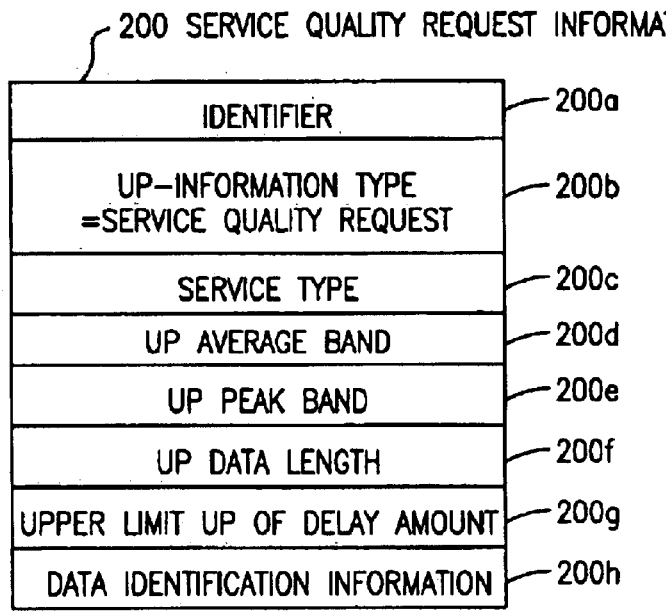
FIG. 7 is a diagram illustrating the format of the service-quality-request information 200 in a multi-access communication system according to a first embodiment of the present invention.

FIG. 7 is a diagram illustrating the format of the service-quality-request information 200 according to the first embodiment of the present invention. The service-quality-request information 200 includes an identifier 200a, an up-information type 200b, a service type 200c, an up average band 200d, an up peak band 200e, an up data length 200f, the upper limit value 200g of an up delay amount, and data identification information 200h. The identifier 200a is an identifier previously allocated to the subscriber station 30 by the center station 10 before transmission of the service-quality-request information 200. The up information type 200b represents the type of information regarding an up-frame, that is, service-quality-request information. The service type 200c is the type of required service and designates an assurance of a average band, assurance of a peak band, and assurance of the upper limit value of an up-delay amount. The up average band 200d corresponds to an up average band of a service. The up peak band 200e corresponds to an up peak band. The up data length 200f corresponds to an up data length. When the up data length 200f is variable, the maximum value, the minimum value and an average value thereof are designated. The upper limit value 200g of up delay amount is the upper limit value of an up delay amount required by a service. The data identification information 200h is information for identifying up data requiring a service quality assurance. The data identification information 200h designates a destination address of up data, a destination port number, a transmission open source address, a transmission source port number, an upper protocol type, and the like.

Figure 8:
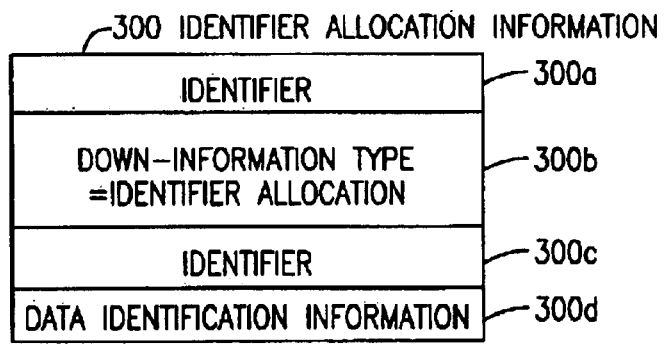
FIG. 8 is a diagram illustrating the format of the identifier allocation information 300 in a multi-access communication system according to a first embodiment of the present invention.

FIG. 8 is a diagram illustrating the format of the identifier allocation information 300 according to the first embodiment of the present invention. The allocation information 300a is formed of an identifier 300a, a down information type 300b, an identifier 300c and data identification information 300d. The identifier 300a is an identifier previously allocated to the subscriber station 30 by the center station 10 before the receiving of the identifier allocation information 300. The down information type 300b indicates that the type of down frame information corresponds to identifier allocation information. The identifier 300c is an identifier newly allocated to the subscriber station 30 by the center station 10. The data identification information 300d is information for identifying up data designated by the identifier 300c.

Figure 9:
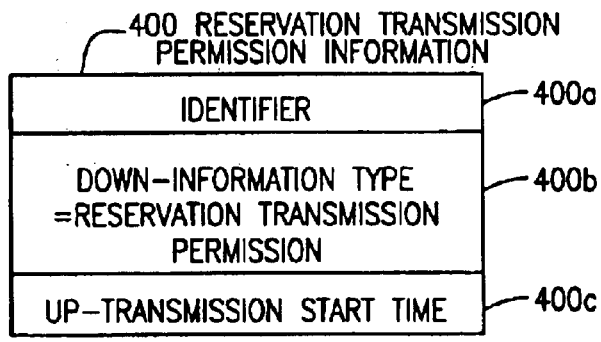
FIG. 9 is a diagram illustrating the format of the reservation-transmission-permission information 400 in a multi-access communication system according to a first embodiment of the present invention.

FIG. 9 is a diagram illustrating the format of the reservation transmission permission information 400 according to the first embodiment of the present invention. The reservation transmission permission information 400 is formed of an identifier 400a, a down information type 400b and an up transmission start time 400c. The identifier 400a is an identifier previously allocated to the subscriber station 30 by the center station 10. When the identifier 300c newly allocated with the identifier allocation information 300 according to the service quality request information 200 from the subscriber station 30 is specified to the identifier 400a, only the up data reservation transmission requiring the assurance of a service quality is allowed. Moreover, when the center station 10 designates as the identifier 400a an identifier allocated for normal data at the setup time of the subscriber station 30, the reservation transmission of all pieces of up data issued by the subscriber station 30 is allowed. The down information type 400b shows that the type of down frame information is reservation transmission permission information. The up transmission start time 400c is the time when the subscriber station 30 is allowed to start transmission of reservation information.

Figure 10:
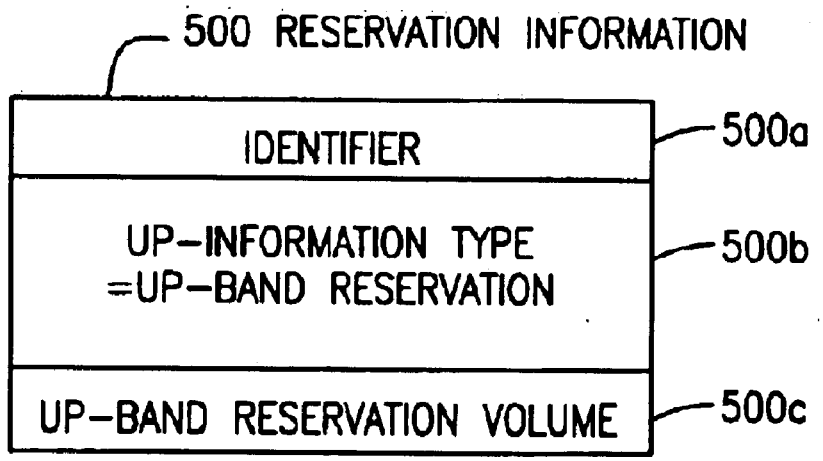
FIG. 10 is a diagram illustrating the format of the reservation information 500 in a multi-access communication system according to a first embodiment of the present invention.

FIG. 10 is a diagram illustrating the format of the reservation information 500 according to the first embodiment of the present invention. The reservation information 500 is formed of an identifier 500a, an up-information type 500b and an up band reservation volume 600c. The identifier 500a is an identifier previously allocated to the subscriber station 30 by the center station 10. When the service quality assurance is required, an identifier allocated according to a service is added. The up information type 500b indicates that the type of up frame information is reservation information. The up band reservation volume 500c is the up-band volume reserved by the subscriber station 30.

Figure 11:
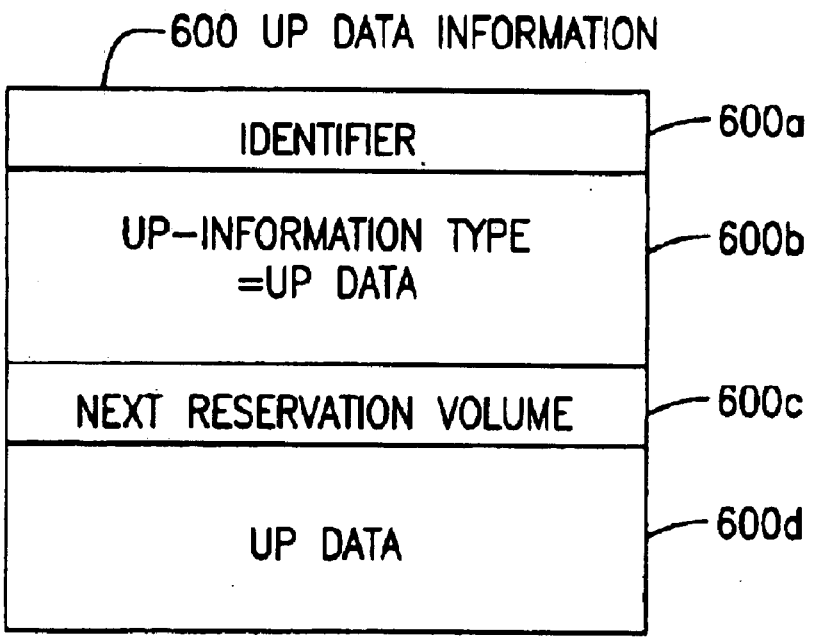
FIG. 11 is a diagram illustrating the format of the up-data information 600 in a multi-access communication system according to a first embodiment of the present invention.

FIG. 11 is a diagram illustrating the format of the up data information 600 according to the first embodiment of the present invention. The up data information 600 is formed of an identifier 600a, an up information type 600b, a next reservation volume 600c and up data 600d. The identifier 600a is an identifier previously allocated to the subscriber station 30 by the center station 10. When a service quality assurance is required, an identifier allocated according to the service is added. The up information type 600b shows that the type of up frame information is up data. The next reservation volume 600c is a service specified with the identifier 600a by means of the subscriber station 30. The next reservation amount 600c shows the volume of an up band to be reserved when there is the up-data to be next transmitted. The up data 600d is up data transmitted to the center station 10 by the subscriber station 30.

Second Embodiment

Figure 12:
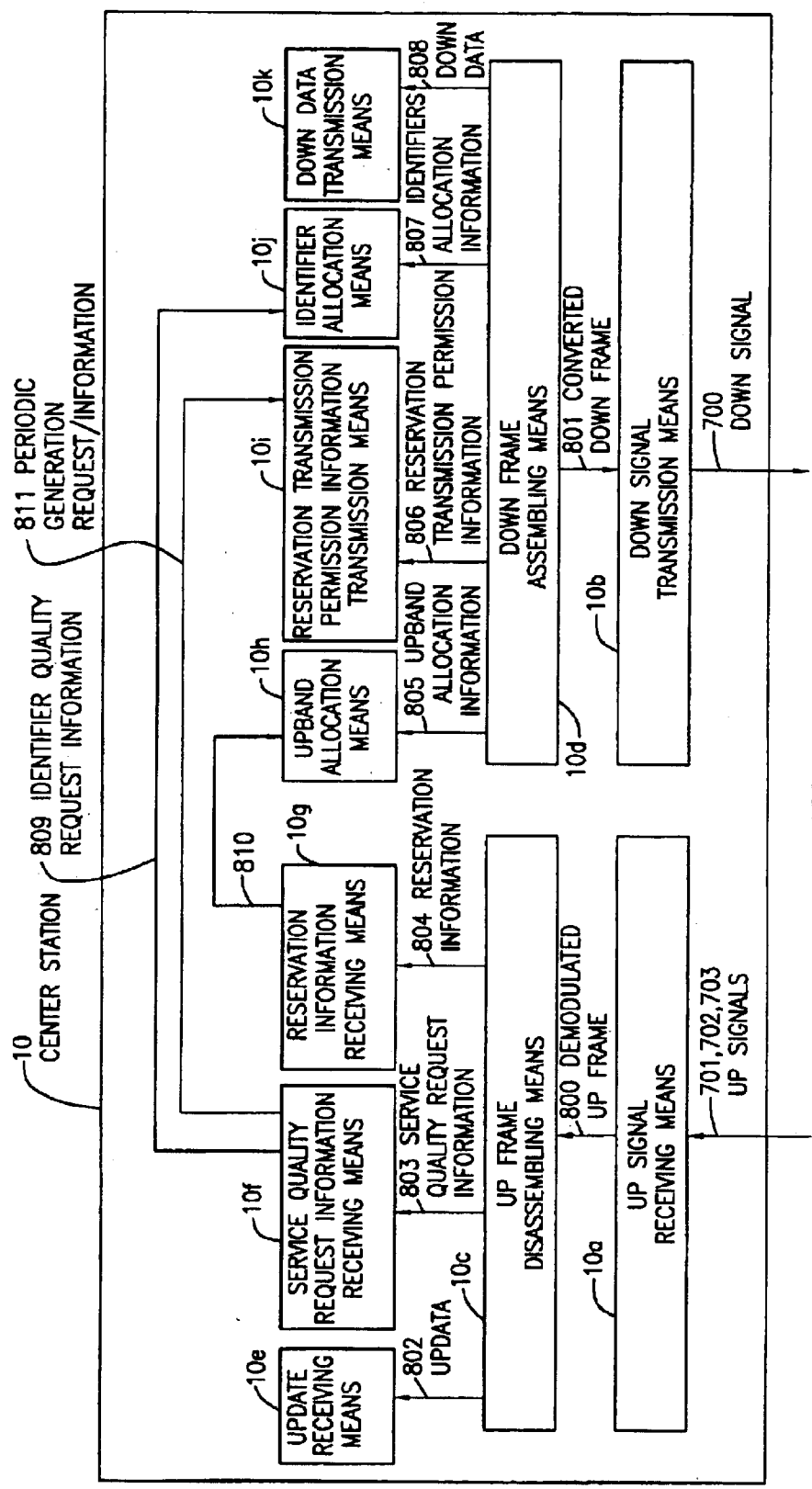
FIG. 12 is a block diagram illustrating the center station 100 in a multi-access communication system according to a second embodiment of the present invention.

Next, the second embodiment of the present invention will be described below with reference to the drawings. FIG. 12 is a diagram illustrating the configuration of the center station 10 according to the second embodiment of the present invention. In the center station 10, the service quality request information receiving means 10f receives the service quality request information 803 from a subscriber station and then outputs identifier quality request information 809 to the identifier allocation means 10i. When the priority of a service requested according to the service quality request information 803 is high, the service quality request information receiving means 10f outputs periodic-generation-request information 811 to the reservation-transmission-permission information transmission means 10i. Thereafter, in response to the periodic-generation-request information 811, the reservation-transmission-permission information transmission means 10i periodically transmits reservation-transmission-permission information to the service requested according to the service quality request information 803.

Figure 13:
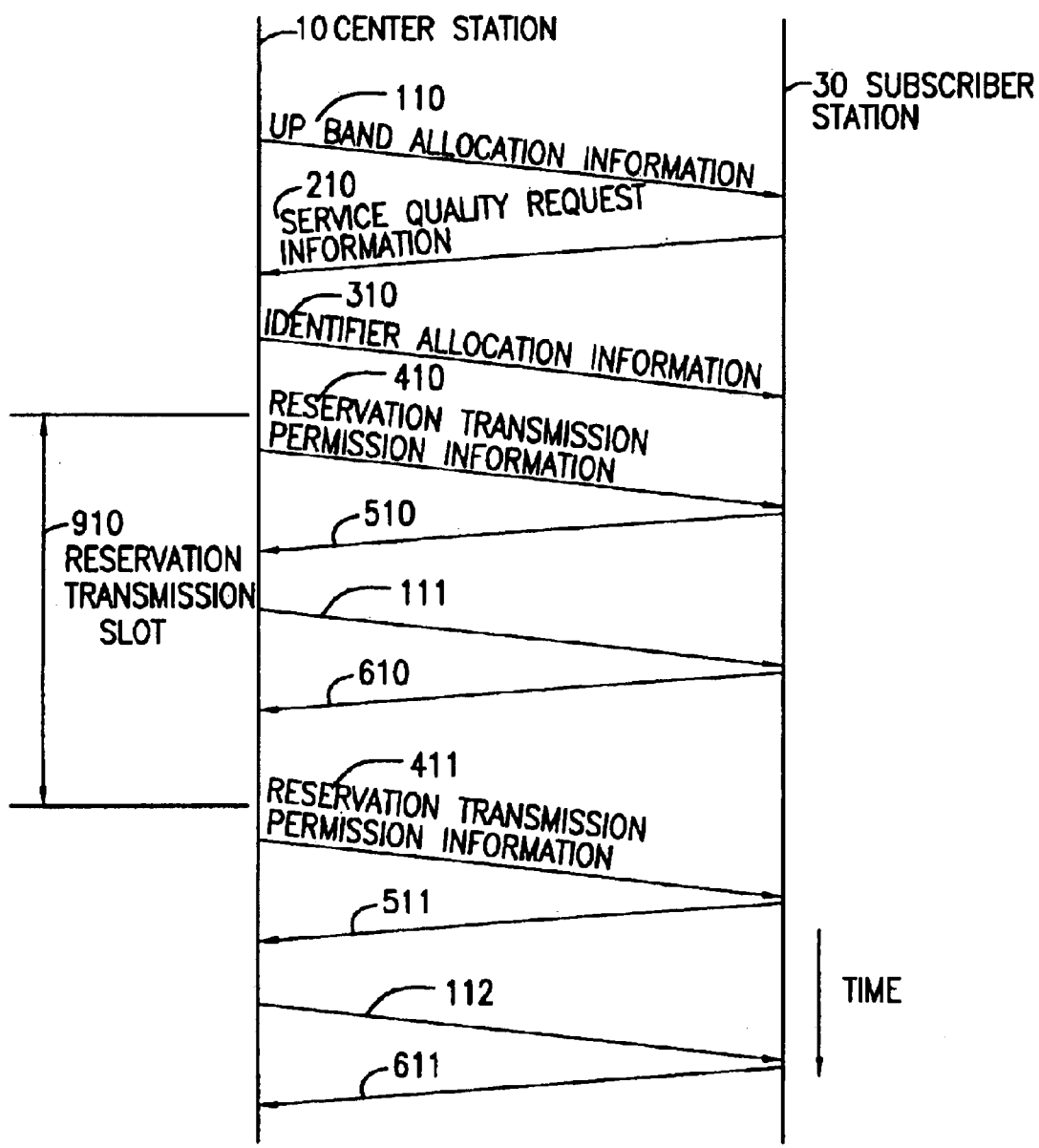
FIG. 13 is a flowchart illustrating the operation of the center station 10 and the operation of the subscriber station 30 in a multi-access communication system according to a second embodiment of the present invention.

FIG. 13 is a flowchart illustrating the operation of the center station 10 and the operation of the subscriber station 30 according to the second embodiment of the present invention. Like the first embodiment of the present invention, when the subscriber station 30 requests the assurance of a service quality, it transmits the service quality request information 210 to the center station 10. Then, the center station 10 transmits the identifier allocation information 310 to the subscriber station 30 to allocate an identifier. Next, when the priority of a service specified according to the service quality request information 210 is high, the center station 10 transmits reservation-transmission-permission information 410 and 411 to the subscriber station 30 at intervals of the reservation permission transmission slot 910, thus checking for the presence or absence of reservation information.

Thus, compared with the method of periodically transmitting up-band allocation information to subscribers, the above-mentioned method can suppress a waste use of the up band by periodically transmitting the reservation-transmission-permission information to the subscriber station to which a service quality with high priority is required, even in the situation where time intervals of up-data generated by subscriber stations vary. Moreover, the upper limit value of an up-delay amount can be insured by adjusting the transmission period of reservation-transmission-permission information.

Third Embodiment

Figure 14:
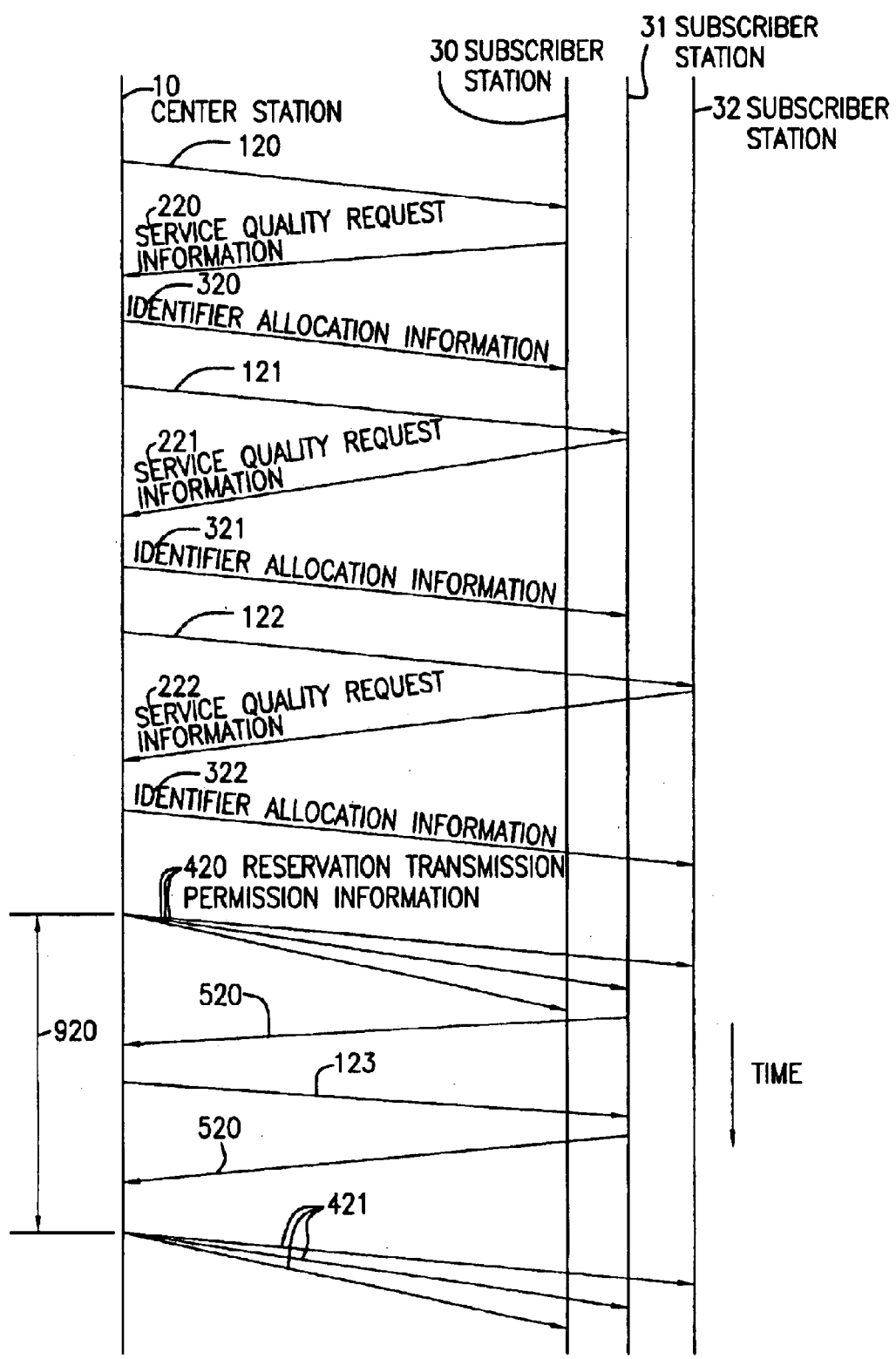
FIG. 14 is a flowchart illustrating the operation of the center station 10 and the operation of the subscriber stations 30, 31 and 32 in a multi-access communication system according to a third embodiment of the present invention.

Next, the third embodiment of the present invention will be described below with reference to the attached drawings. FIG. 14 is a diagram illustrating the operation of the center station 10 and the operation of the subscriber stations 30, 31 and 32 according to the third embodiment of the present invention. Like the first and second embodiments of the present invention, when the subscriber stations 30, 31 and 32 use the same service, each subscriber station transmits service quality request information 220, 221 and 222 to the center station 10, respectively. The center station 10 transmits identifier allocation information 320 to the subscriber station 30 according to a requested service quality. The center station 10 transmits identifier allocation information 321 to the subscriber station 31 according to a requested service quality. The center station 10 transmits identifier allocation information 322 to the subscriber station 32 according to a requested service quality. In this case, a unique identifier to the subscriber station 30 is allocated to the identifier allocation information 320; a unique identifier to the subscriber station 31 is allocated to the identifier allocation information 321; and a unique identifier to the subscriber station 32 is allocated to the identifier allocation information 322. A common identifier is allocated to the subscriber station group 30, 31 and 32.

When the priorities of services specified according to the service quality request information 220, 221 and 222 are high, the center station transmits the reservation transmission permission information 420 with a common identifier to the subscriber stations 30, 31 and 32 at intervals of reservation permission transmission slot 920. Only when there is up data to be transmitted of a service specified by the identifier of the reservation transmission permission information 420, the subscriber stations 30, 31 and 32 transmit reservation information to the center station 10. If the subscriber station 30 has up data to be transmitted of a specified service, the subscriber station 31 transmits the reservation information 520 to the center station 10. At this time, as the identifier of the reservation information 520 is used an identifier uniquely allocated to the subscriber station 31, rather than an identifier commonly allocated to the subscribers 30, 31 and 32. Thereafter, likewise the first and second embodiments, when the center station 10 transmits the up-band allocation information 123 to the subscriber station 31 to allocate an up band, the subscriber station 31 transmits the up data 620 to the center station 10.

As described above, only the subscriber station having up-data to be transmitted returns reservation information by using the common identifier to the subscriber stations 30, 31 and 32 which uses the same service and periodically transmitting reservation transmission permission information, so that the use efficiency of an up band can be improved. However, where plural subscriber stations in a subscriber station group which has transmitted reservation transmission permission information hold data to be transmitted, there is the possibility that a collision between pieces of reservation information may occur. This may cause the band allocation to be delayed by the time required for solving the collision of reservation information. For that reason, the third embodiment of the present invention does not require to precisely insure the up delay time and is suitable for the case where many subscriber stations request the service quality assurance.

Figure 15:
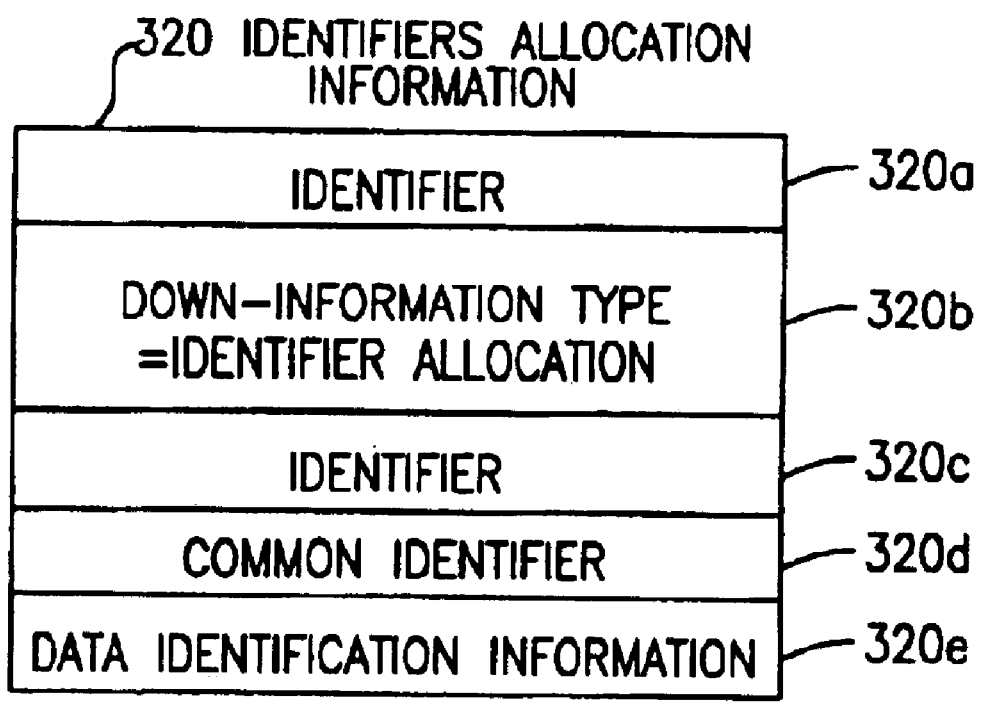
FIG. 15 is a diagram illustrating the format of the identifier allocation information 320 in a multi-access communication system according to a third embodiment of the present invention.

FIG. 15 is a diagram illustrating the format of the identifier allocation information 320 according to the third embodiment of the present invention. The identifier allocation information 320 consists of an identifier 320a, a down information type 320b, an identifier 320c, a common identifier 320d and data identification information 320e. The down information type 320b shows that the type of information about a down frame corresponds to identifier allocation information. The identifier 320c is an identifier uniquely allocated to the subscriber station 30 by the center station 10. The common identifier 320d is an identifier commonly allocated to the subscriber stations 30, 31 and 32 by the center station 10. The data identification information 320e is information for identifying up data designated by the identifiers 320c and 320d.

Fourth Embodiment

Figure 16:
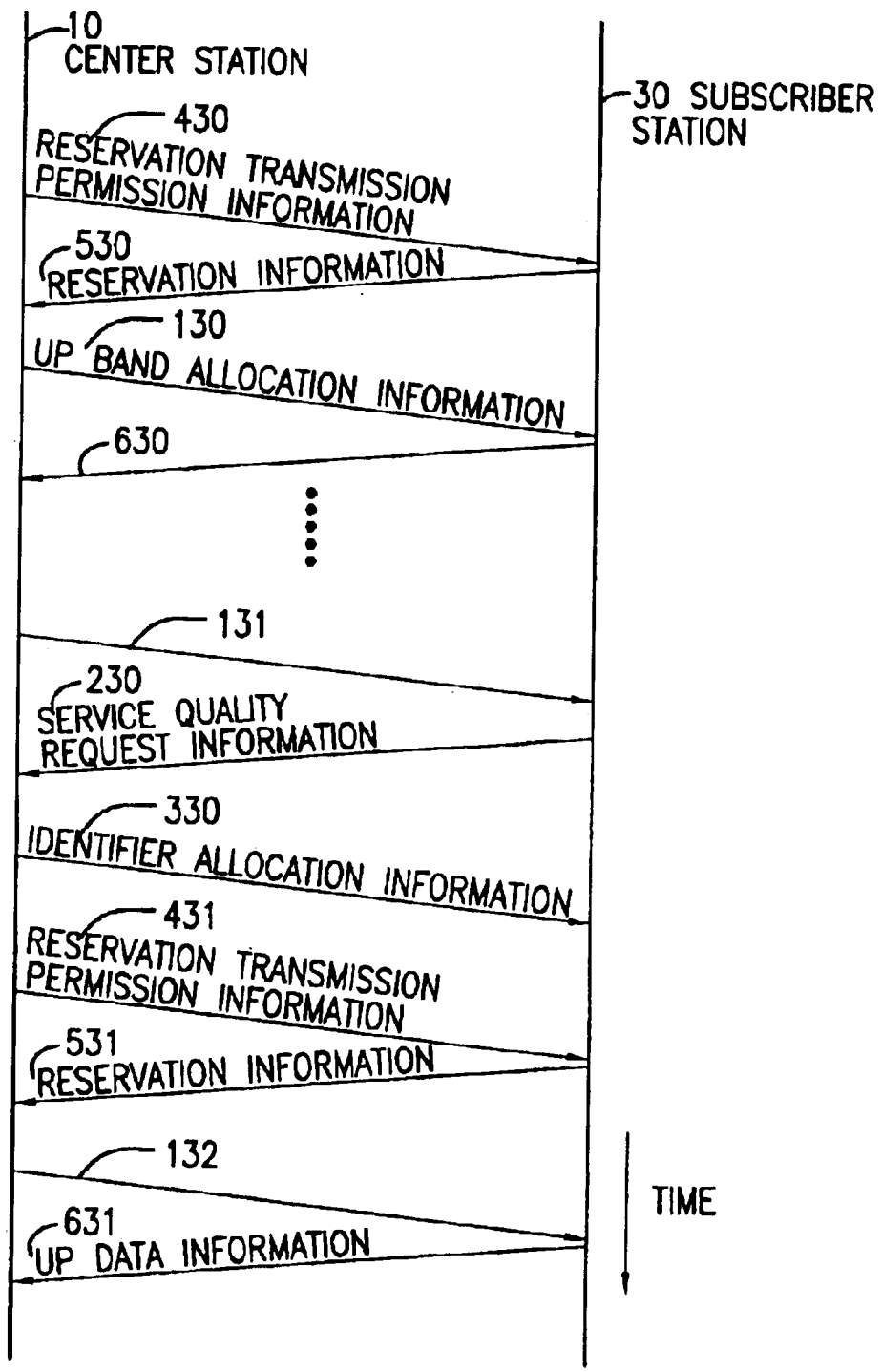
FIG. 16 is a flowchart illustrating the operation of the center station 10 and the operation of the subscriber station 30 in a multi-access communication system according to a fourth embodiment of the present invention.

Next, the fourth embodiment of the present invention will be described below with reference to the attached drawings. FIG. 16 is a diagram illustrating the operation of the center station 10 and the operation of the subscriber station 30 according to the fourth embodiment of the present invention. Likewise the first, second and third embodiments of the present invention, when the center station 10 transmits the reservation transmission permission information 430 to the subscriber station 30, the subscriber station holding up data to be transmitted transmits the reservation information 530 to the center station 10. On the other hand, when the center station 10 transmits the up-band allocation information 130 and allocates the up band to the subscriber station 30, the subscriber station 30 transmits the up-data information 30 to the center station 10.

Next, when the subscriber station 30 starts a new service and requires the service quality assurance, the center station 10 transmits the service quality request information 230. The center station 10 transmits the identifier allocation information 330 to the subscriber station 30 according to the requested service quality and then allocates a new identifier. Thereafter, in the mode of transmitting up data of the service, when the center station 10 transmits the reservation transmission permission information 431 to the subscriber station 30, the subscriber station 30 transmits the reservation information 531 with an identifier dynamically allocated to the center station 10. On the other hand, when the center station 10 transmits up-band allocation information 132 and allocates the up band to the subscriber station 30, the subscriber station 30 transmits the up data information 631 to the center station 10.

As described above, since the center station dynamically allocates the identifier of a service to a subscriber station, the subscriber station can make an up-service quality request at a given time. Moreover, the center station does not need to transmit reservation transmission permission information while the subscriber station stops the used of a service, so that the use efficiency of an up band can be increased.

Fifth Embodiment

Figure 17:
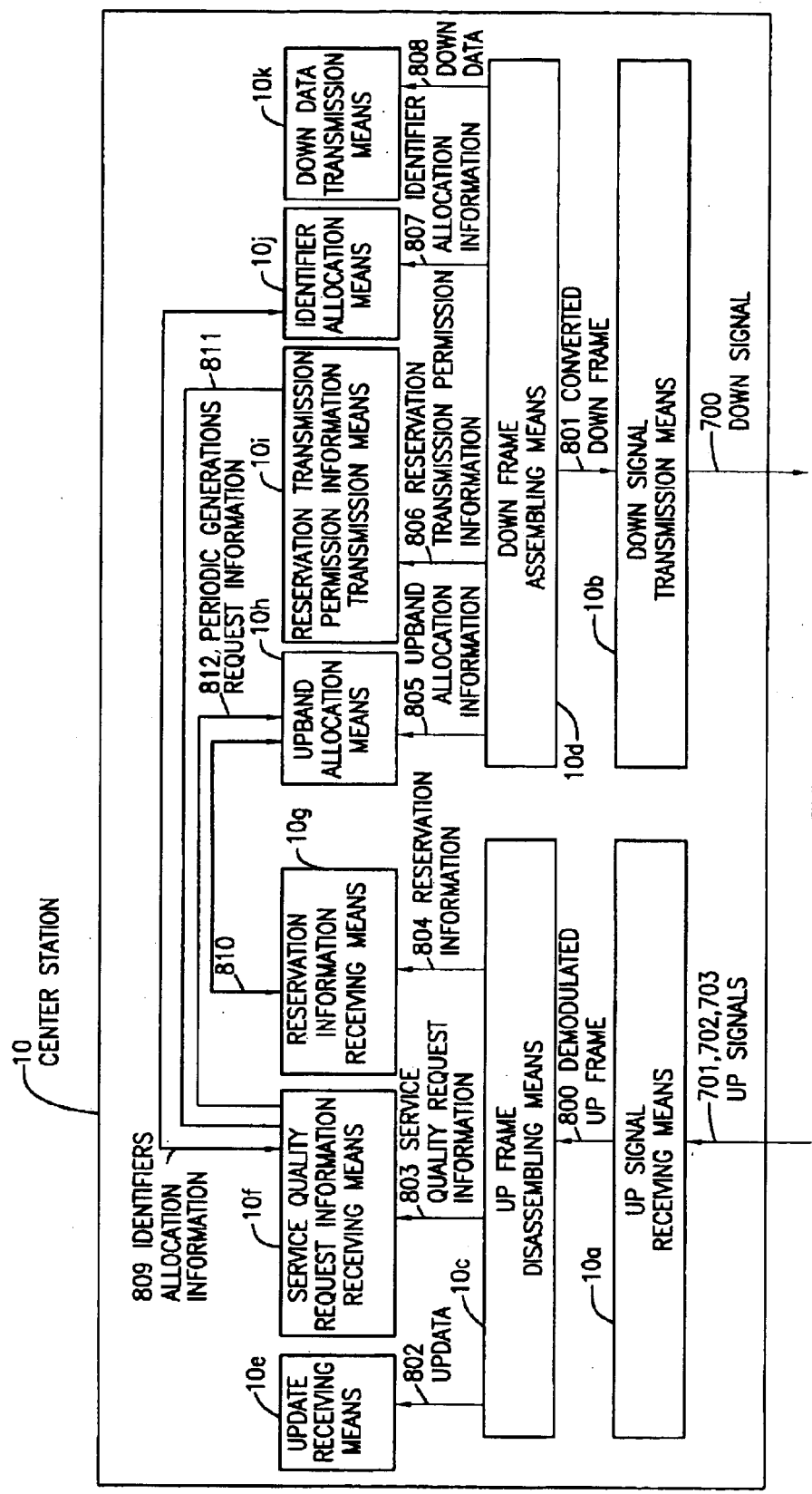
FIG. 17 is a block diagram illustrating the center station 10 according to a fifth embodiment of the present invention.

Next, the fifth embodiment of the present invention will be described below with reference to the attached drawings. FIG. 17 is a diagram illustrating the configuration of the center station 10 according to the fifth embodiment of the present invention. In the center station 10, the service-quality-request information receiving means 10f selects the method of receiving the service quality request information 803 from a subscriber station, outputting the identifier allocation information 809 to the identifier allocation means 10j, and allocating up band to the upper limit value of a delay amount requested according to the service quality request information 803.

When the upper limit value of a requested delay amount is minimum and an accurate upper limit value is insured, the periodic-generation-request information 812 designating a specific subscriber station is output to the up-band allocation means 10h. When the data generation interval is large and the assurance of the upper limit value of a delay amount is required, the periodic-generation-request information 812 designating a specific subscriber station is output to the reservation-transmission-permission information transmission means 10i. Moreover, when the assurance of the upper limit value of a delay amount is not required but a low delay amount is required, the periodic-generation-request information 811 which requires a specific subscriber station group is output to the reservation-transmission-permission information transmission means 10i. When stable transmission is desired in a congestion state, although a low delay amount is not required, the band allocation priority control rather than the periodic transmission control is particularly performed to a service with the identifier added to reservation information.

As described above, the center station selects the up-band allocation method according to the service quality required by a subscriber station, so that the up band can be more flexibly allocated.

Sixth Embodiment

Figure 18:
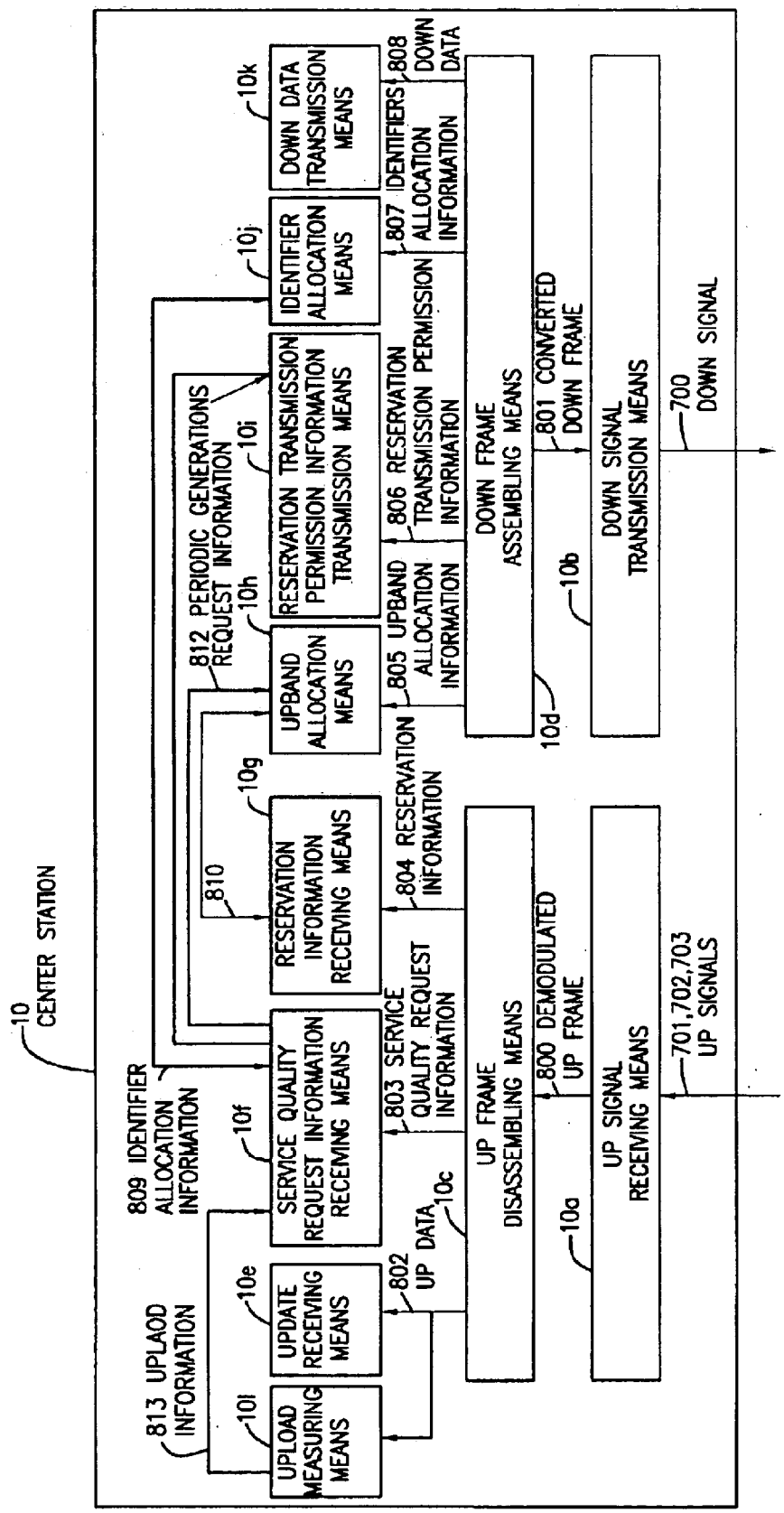
FIG. 18 is a block diagram illustrating the center station 10 in a multi-access communication system according to a sixth embodiment of the present invention.

Next, the sixth embodiment of the present invention will be described below with reference to the attached drawings. FIG. 18 is a diagram illustrating the configuration of the center station 10 according to the sixth embodiment of the present invention. In the center station 10, the up-load measuring means 101 periodically monitors the volume of the up data 802 input to the center station 10 and outputs the up-load information 813 to the service-quality-request information receiving means 10f. The service-quality-request information receiving means 10f selects the up-band allocation method according to the up-load information 813.

When the up-load is heavy, the periodic-generation-request information 812 which specifies a specific subscriber station is output to the up-band allocation means 10h or to the reservation-transmission-permission information transmission means 10i. When the up load is middle, the periodic-generation-request information 811 which specifies a specific subscriber station group is output to the reservation-transmission-permission information transmission means 10i. When the up load is light, the band allocation priority control, rather than the periodic transmission control, is particularly performed to a service with an identifier added to the reservation information. As described above, since the center station selects the up-band allocation method according to load conditions, the up band can be allocated with high efficiency.

As described above, according to the present invention, in the multi-access communication system such as bi-directional CATV networks, passive optical star networks and the like, where a center station dynamically allocate the band of an uplink to subscribers, the band of an uplink can be flexibly and effectively allocated in an up-service quality assurance mode.

In concrete, the center station allocates an identifier to a subscriber station according to the service quality requested by the subscriber station whereas the subscriber station transmits reservation information using the identifier. Consequently, the band allocation control flexibly performs according to the up-service quality without previously and fixedly determining the up-service-to-priority relationship in the center station and the subscriber station.

According to the present invention, the center station decides the transmission period of reservation-transmission-permission information to be transmitted to a subscriber station based on service-quality-request information from the subscriber station using a service with high priority. Hence, even under circumstances where the interval between pieces of up data issued by a subscriber station widely varies, it can be suppressed that the up band is wastefully consumed. Since the center station transmits reservation-transmission-permission information to only subscriber stations which request a service with high priority, a collision of up-reservation information, which may occurs in transmission of common data, does not occur between subscriber stations. As a result, the upper limit value of an up delay amount can be insured.

According to the present invention, the center station periodically transmits reservation-transmission-permission information to a subscriber station group which use the same service, using the common identifier. Thus, since only the subscriber station having up data to be transmitted returns the reservation information, the use efficiency of the up band can be improved.

Moreover, according to the present invention, since the center station dynamically allocates the identifier of a service to a subscriber station, the subscriber station can perform an up-service quality request at a given time. Moreover, since the center station does not need to transmit reservation-transmission-permission information while a subscriber station stops the use of a service, the use efficiency of the up band can be improved.

Furthermore, according to the present invention, the center station selects either transmitting up-band-allocation information periodically allocated to a subscriber station, reservation-transmission-permission information to which a unique identifier is added, or reservation-transmission-permission information to a subscriber station group which includes the above-mentioned subscriber station and uses the same service, or transmitting nothing, based on service-quality-request information from the subscriber station or based on the value of an up load of a subscriber station. Thus, the up band can be more flexibly allocated to a service quality request or can be more effectively allocated according to load conditions.

The entire disclosure of Japanese Patent Application No. 10-018318 filed on Jan. 16, 1998 including specification, claims, drawing and summary are incorporated herein by reference in its entirety.

What is claimed is:

1. A multiple access communication system comprising:
    a center station;
    subscriber stations;
    a broadcast downstream channel linked from said center station to said subscriber stations; and
    a multiple access upstream channel linked from said subscriber stations to said center station;
    said center station assigning identifiers to one or more of said subscriber stations, each of said identifiers corresponding to a service quality assurance supplied to a particular subscriber station;
    said subscriber stations having upstream data to be transmitted transmitting reservation information to the center station within a range of bandwidth permitted by said center station, said reservation information including said identifier and an amount of upstream bandwidth to be reserved;
    said center station allocating upstream bandwidth to said subscriber stations based on said reservation information and in order of priority according to the service quality designated by said identifier.

2. The multiple access communication system defined in claim 1, wherein said center station periodically transmits reservation transmission permission information to which the identifier of said service is added, to said subscriber station using a high priority service.

3. The multiple access communication system defined in claim 1, wherein:
    said center station allocates a unique identifier to each of said subscriber stations each using a high priority service and allocates a common identifier to a group of a subscriber station group using said high priority service;
    said center station periodically transmits reservation transmission permission information to which a common identifier is added, to said subscriber station group using a high priority service; and
    said subscriber station having data to be transmitted upstream, said upstream data corresponding to the service designated by said identifier transmits reservation information for upstream bandwidth to the center station.

4. The multiple access communication system defined in claim 1, wherein when said subscriber station starts to use a new service, said subscriber station informs said center station of the quality of said service, and wherein said center station allocates a new unique identifier to said subscriber station and a common identifier to said subscriber station group using the same service.

5. The multiple access communication system defined in claim 2, wherein when said subscriber station starts to use a new service, said subscriber station informs said center station of the quality of said service, and wherein said center station allocates a new unique identifier to said subscriber station and a common identifier to said subscriber station group using the same service.

6. The multiple access communication system defined in claim 3, wherein when said subscriber station starts to use a new service, said subscriber station informs said center station of the quality of said service, and wherein said center station allocates a new unique identifier to said subscriber station and a common identifier to said subscriber station group using the same service.

7. The multiple access communication system defined in claim 1, wherein said center station periodically transmits upstream bandwidth allocation information to said subscriber station according to a service quality informed from said subscriber station, periodically transmits reservation transmission permission information with a unique identifier to said subscriber station, periodically transmits reservation transmission permission information to said subscriber station group, said subscriber station group including said subscriber station and using the same service, or selectively performs a periodic transmission control to a service.

8. The multiple access communication system defined in claim 2, wherein said center station periodically transmits upstream bandwidth allocation information to said subscriber station according to a service quality informed from said subscriber station, periodically transmits reservation transmission permission information with a unique identifier to said subscriber station, periodically transmits reservation transmission permission information to said subscriber station group, said subscriber station group including said subscriber station and using the same service, or selectively performs a periodic transmission control to a service.

9. The multiple access communication system defined in claim 3, wherein said center station periodically transmits upstream bandwidth allocation information to said subscriber station according to a service quality informed from said subscriber station, periodically transmits reservation transmission permission information with a unique identifier to said subscriber station, periodically transmits reservation transmission permission information to said subscriber station group, said subscriber station group including said subscriber station and using the same service, or selectively performs a periodic transmission control to a service.

10. The multiple access communication system defined in claim 4, wherein said center station periodically transmits upstream bandwidth allocation information to said subscriber station according to a service quality informed from said subscriber station, periodically transmits reservation transmission permission information with a unique identifier to said subscriber station, periodically transmits reservation transmission permission information to said subscriber station group, said subscriber station group including said subscriber station and using the same service, or selectively performs a periodic transmission control to a service.

11. The multiple access communication system defined in claim 1, wherein said center station periodically measures an up-load received from said subscriber station; and wherein said center station periodically transmits up-load allocation information to said subscriber station according to a measured up-load value, periodically transmits reservation transmission permission information to said subscriber station, said reservation transmission permission information having a unique identifier, periodically transmits reservation transmission permission information to said subscriber station group, said subscriber station group including said subscriber station and using the same service, or selectively performs a periodic transmission control to the service.

12. The multiple access communication system defined in claim 2, wherein said center station periodically measures an up-load received from said subscriber station; and wherein said center station periodically transmits up-load allocation information to said subscriber station according to a measured up-load value, periodically transmits reservation transmission permission information to said subscriber station, said reservation transmission permission information having a unique identifier, periodically transmits reservation transmission permission information to said subscriber station group, said subscriber station group including said subscriber station and using the same service, or selectively performs a periodic transmission control to the service.

13. The multiple access communication system defined in claim 3, wherein said center station:
periodically measures an up-load received from said subscriber station,
periodically transmits up-load allocation information to said subscriber station according to said measured up-load value,
periodically transmits reservation transmission permission information to said subscriber station, said reservation transmission permission information having a unique identifier, and
periodically transmits reservation transmission permission information to a subscriber station group, said subscriber station group including subscriber stations that either use the same service or selectively perform a periodic transmission control to the service.

14. The multiple access communication system defined in claim 4, wherein said center station:
periodically measures an up-load received from said subscriber station,
periodically transmits up-load allocation information to said subscriber station according to said measured up-load value,
periodically transmits reservation transmission permission information to said subscriber station, said reservation transmission permission information having a unique identifier, and periodically transmits reservation transmission permission information to a subscriber station group, said subscriber station group including subscriber stations that either use the same service or selectively perform a periodic transmission control to the service.

15. A method of allocating upstream bandwidth in a multiple access communication system including a center station, subscriber stations, a broadcast downstream channel linked from said center station to said subscriber stations, and a multiple access upstream channel linked from said subscriber stations to said center station, wherein said center station allocates identifiers to said subscriber stations identifying a service quality assurance required by a particular subscriber station, wherein a particular subscriber station having upstream data to be transmitted transmits reservation information within a band permitted by said center station, said reservation information including said identifier and an amount of upstream bandwidth to be reserved, wherein said center station allocates upstream bandwidth to said subscriber station based on said reservation information, said method comprising the steps of:
issuing requests for service quality assurances from said subscriber stations to said center station;
allocating said identifier for each of said service assurances by means of said center station and then informing said subscriber stations of the allocation;
transmitting, after said center station transmits the reservation transmission permission information to said subscriber stations, the reservation information from said subscriber stations to said center station by adding said identifier according to the service type of the up-data to be transmitted; and
allocating upstream bandwidth from data with higher priority in decreasing order of priority by means of said center station according to the service quality designated by said identifier of the reservation information.

16. The method defined in claim 15, further comprising the step of periodically transmitting reservation transmission permission information to which the identifier of said service is added, from said center station to said subscriber station using a high priority service.

17. The method defined in claim 15, further comprising the steps of:
allocating a unique identifier from said center station to each of said subscriber stations each using a high priority service, and allocating a common identifier to said subscriber stations using said high priority service;
periodically transmitting reservation transmission permission information to which a common identifier is added, from said center station to said subscriber station group using a high priority service; and
transmitting reservation information for upstream bandwidth from said subscriber station having up-data to be transmitted corresponding to service designated by the identifier, to said center station.

18. The method defined in claim 15, further comprising the steps of:
issuing, when said subscriber station starts to use a new service, the quality of said service from said subscriber station to said center station; and
allocating a new unique identifier to said subscriber station and a common identifier to said subscriber station group using the same service by means of said center station.

19. The method defined in claim 15, further comprising the step of:
periodically transmitting upstream bandwidth allocation information from said center station to said subscriber station according to a service quality informed from said subscriber station, or periodically transmitting reservation transmission permission information with a unique identifier from said center station to said subscriber station, or periodically transmitting reservation transmission permission information from said center station to said subscriber station group, said subscriber station group including said subscriber stations using the same service, or selectively performing a periodic transmission control to a service.

20. The method defined in claim 15, further comprising the steps of:
periodically measuring upstream bandwidth allocation information to said subscriber station by means of said center station according to a measured up-load value, or periodically transmitting reservation transmission permission information to said subscriber station, said reservation transmission permission information having a unique identifier, or periodically transmitting reservation transmission permission information to said subscriber station group, said subscriber station group including subscriber stations using the same service, or selectively performing a periodic transmission control to the service.

21. A multiple access communication system comprising:

a broadcast downstream channel between a center station and one or more subscriber stations;

a multiple access upstream channel between said one or more subscriber stations and said center station; and a center station that:
- receives requests for service quality assurance from said one or more subscriber stations;
- assigns an identifier to said one or more subscriber stations, said identifier designating the service quality assurance requested by said one or more subscriber stations; and
- allocates upstream bandwidth to said one or more subscriber stations based on reservation information sent to said center station by said one or more subscriber stations, said reservation information including said identifier and an amount of upstream bandwidth to be reserved within a range of bandwidth permitted by said center station, and said upstream bandwidth being allocated by said center station in decreasing order of priority according to the service quality designated by said identifier.

22. A method of allocating upstream bandwidth in a multiple access communication system including a center station, subscriber stations, a broadcast downstream channel between said center station and said subscriber stations, and a multiple access up stream channel between said subscriber stations to said center station, said method comprising:

issuing requests from a particular subscriber station to said center station for a service quality assurance required by said subscriber station;

assigning an identifier to said subscriber station that identifies the service quality assurance required by said subscriber station;

transmitting said identifier to said subscriber station;

transmitting reservation transmission permission information from said center station to said subscriber station, said reservation transmission permission information including;

transmitting reservation information from said subscriber station to said center station within a band permitted by said center station, said reservation information including said identifier and an amount of upstream bandwidth to be reserved; and allocating upstream bandwidth to said subscriber station based on said reservation information in order of priority according to the service quality designated by said identifier.

* * * * *